United States Patent [19]
Guillemette

[11] Patent Number: 5,853,770
[45] Date of Patent: *Dec. 29, 1998

[54] COEXTRUSION DIE COMPONENT SYSTEM

[76] Inventor: Arthur Roger Guillemette, 10 Pike St., West Warwick, R.I. 02893

[*] Notice: The term of this patent shall not extend beyond the expiration date of Pat. No. 5,667,818.

[21] Appl. No.: 713,520

[22] Filed: Sep. 13, 1996

Related U.S. Application Data

[63] Continuation-in-part of Ser. No. 625,779, Mar. 29, 1996, Pat. No. 5,667,818, which is a continuation of Ser. No. 148,009, Nov. 5, 1993, abandoned.

[51] Int. Cl.⁶ .................................................. B29C 47/26
[52] U.S. Cl. ............... 425/113; 264/171.26; 264/173.16; 425/133.1; 425/380; 425/382 R; 425/463; 425/467
[58] Field of Search ..................................... 425/113, 114, 425/131.1, 133.1, 380, 382 R, 382.4, 461, 463, 467; 264/176.1, 172.15, 171.26, 171.27, 173.16

[56] References Cited

U.S. PATENT DOCUMENTS

| | | | |
|---|---|---|---|
| 3,308,508 | 3/1967 | Schrenk | 425/133.1 |
| 3,327,349 | 6/1967 | Lennox | 425/133.1 |
| 3,334,382 | 8/1967 | Lefevre | 425/133.1 |
| 3,365,750 | 1/1968 | Donald | 423/133.1 |
| 3,479,425 | 11/1969 | Lefevre et al. | 425/133.1 |
| 3,640,659 | 2/1972 | Dimitroff | 425/463 |
| 3,947,173 | 3/1976 | Dougherty | 425/113 |
| 4,120,633 | 10/1978 | Feuerherm | 425/133.1 |
| 4,125,585 | 11/1978 | Rosenbaum | 425/133.1 |
| 4,134,952 | 1/1979 | Yoshikawa et al. | 425/133.1 |
| 4,221,756 | 9/1980 | Piper et al. | 425/114 |
| 4,248,824 | 2/1981 | Hattop | 425/133.1 |
| 4,279,851 | 7/1981 | Lord et al. | 425/113 |
| 4,303,734 | 12/1981 | Sullivan | 425/463 |
| 4,383,812 | 5/1983 | Calcagni | 425/463 |
| 4,548,569 | 10/1985 | Pitigliano et al. | 425/133.1 |
| 4,657,497 | 4/1987 | Delennau et al. | 425/133.1 |
| 4,657,718 | 4/1987 | Sicka et al. | 425/131.1 |
| 4,773,954 | 9/1988 | Starnes, Jr. | 425/113 |
| 4,798,526 | 1/1989 | Briggs et al. | 425/113 |
| 5,108,683 | 4/1992 | Anand | 425/133.1 |
| 5,156,715 | 10/1992 | Starnes, Jr. | 425/113 |
| 5,183,669 | 2/1993 | Guillemette | 425/113 |
| 5,279,781 | 1/1994 | Yamasaki | 425/133.1 |
| 5,667,818 | 9/1997 | Guillemette | 425/133.1 |

FOREIGN PATENT DOCUMENTS

| | | | |
|---|---|---|---|
| 1075695 | 2/1960 | Germany | 425/114 |

*Primary Examiner*—Robert Davis
*Assistant Examiner*—Joseph Leyson
*Attorney, Agent, or Firm*—Perman & Green, LLP

[57] ABSTRACT

Multiple die components are constructed to provide separate flow paths for multiple layers of extruded plastic until the exit of the die assembly. The multiple layers are then allowed to join at ambient temperature and pressure.

1 Claim, 3 Drawing Sheets

COEXTRUSION DIE COMPONENT SYSTEM

This is a continuation-in-part application of U.S. application for patent Ser. No. 08/625779, filed Mar. 29, 1996, now U.S. Pat. No. 5,667,818 which is a continuation application of U.S. patent Ser. No. 08/148,009, filed Nov. 5, 1993, now abandoned, the contents of which being incorporated herein by reference.

BACKGROUND OF THE INVENTION

In the extrusion of coatings for wire and other tubular shaped plastic parts, it is necessary that the molten plastic is distributed to the die in a balanced flow while avoiding dead spots in the flow path. The new die system of this invention provides a passage which distributes the molten plastic evenly to the conical passage of the die head.

A die system using a balanced flow passage is shown in FIG. 1. The die system shown provides for the distribution of two plastic streams one creating a first tubular layer in channel A and a second tubular layer in channel B. With the balanced flow system, multiple layers can be applied with great accuracy within the die and a tubular product emerges from the die with two distinct layers. However, a problem arises when it is desirable to construct the layers of materials having significantly different viscosity in the molten state or different melting temperature. This becomes particularly troublesome when the first layer is less viscous than the second layer. In this situation the two layers become mixed and the goal of applying two or more distinct layers is lost.

It is the purpose of this invention to provide a tip, tip die and a die which cooperate to maintain a separate and distinct flow for each layer until the materials exit the die. The layers are joined at ambient pressure and temperature and avoid the mixing problem of prior art systems.

SUMMARY OF THE INVENTION

Multiple die components are constructed to provide separate flow paths for multiple layers of extruded plastic until the exit of the die assembly. The multiple layers are then allowed to join at ambient temperature and pressure. The structure of the components also allows for a vacuum to be applied to the region between the two layers as they exit to facilitate joining of the material.

DESCRIPTION OF THE DRAWING

The invention is described in more detail below with reference to the attached drawing in which.

DETAILED DESCRIPTION OF THE PREFERRED EMBODIMENT

Figure 1:
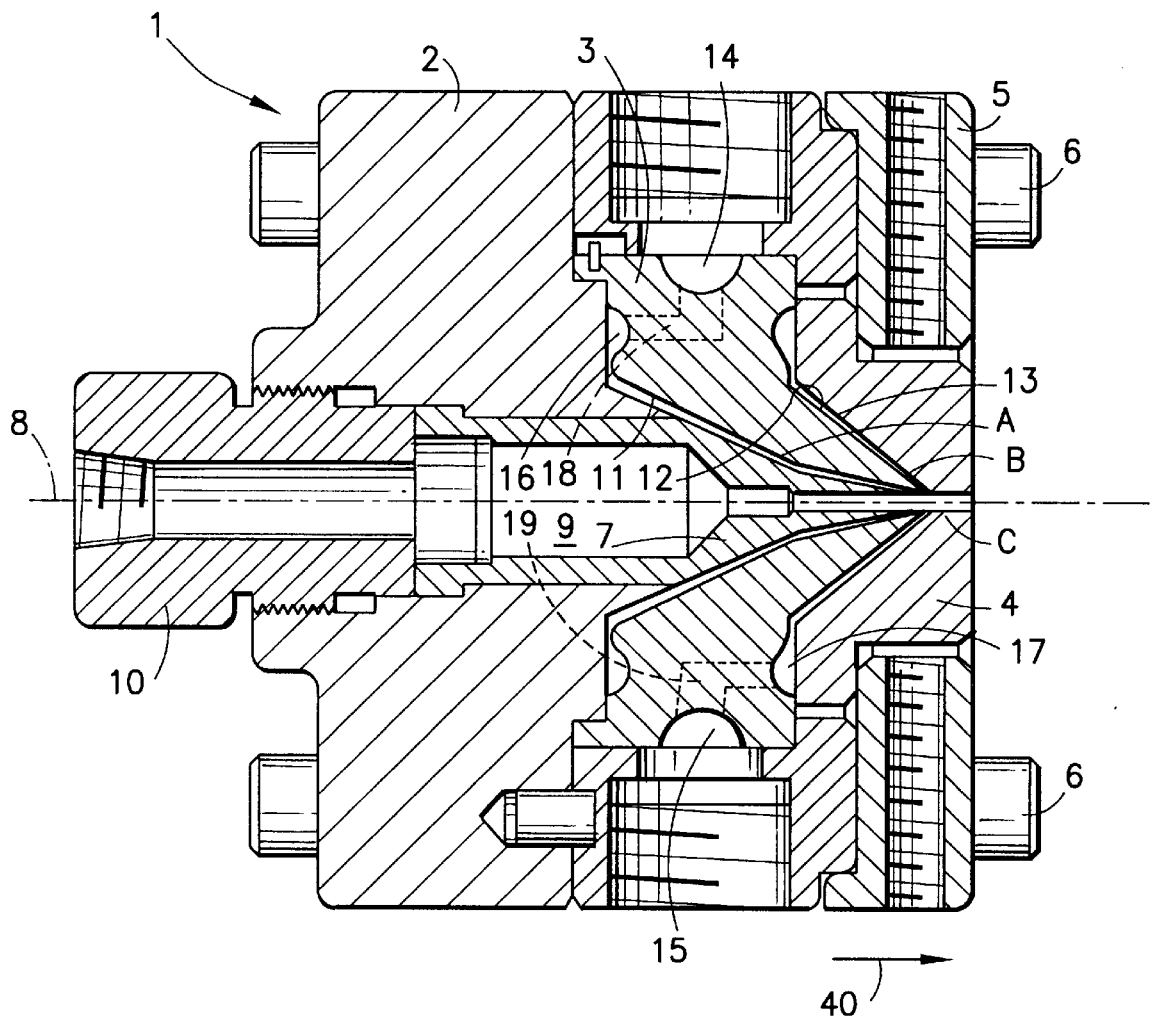
FIG. 1 is a sectional view through the axis of a die assembly showing a balanced flow die passage used to apply a dual layered coating to a wire.

A balanced flow die assembly 1, is shown in FIG. 1 and consists of a die body 2, a tip die 3, die 4 and tip or core pin 7. The components of the die assembly are held in place by retainer ring 5 and bolts 6. Tip 7 is located on the axis 8 of the die assembly 1 and extends axially through the die assembly 1. Tip 7 is constructed with an axial bore 9 through which wire can be fed for receiving a two layered extruded plastic coating. Each component of the die assembly 1 has an axial bore which receives the tip 7. Tip 7 is held in place by tip retainer 10. Tip retainer 10 is constructed with an axially aligned bore which communicates with bore 9, thereby providing external access to the bore 9. The flow of plastic is generally from left to right through the die assembly 1, as shown by arrow 40 in FIG. 1. Tip die 3 is constructed with a downstream conical surface 11 and an axially displaced upstream conical surface 12. The tip 7 has a conically shaped housing that cooperates with the conical surface 11 of the tip die 3 to form a first extrusion channel A for material for a first layer. The extrusion channel A is annular in shape and tapers radially inward in the downstream direction.

Die 4 is in turn constructed with a conical surface 13 which cooperates with the upstream conical surface 12 of tip die 3 to form a second extrusion channel B for material for the second layer. Similarly, the extrusion channel B is annular in shape and tapers radially inward in the downstream direction.

Molten plastic for the first layer is delivered to the die assembly through inlet 14 constructed in the tip die 3 and for the second layer through inlet 15 of tip die 3. A pair of distribution grooves 16 and 17 are constructed in the upstream and downstream faces of the tip die 3. Each groove has a pair of inlets to receive molten plastic about the groove. A pair of flow channels 18 communicate with the groove inlets of groove 16 to deliver flowing plastic to groove 16. A pair of flow channels 19 extend through the tip die 3 from inlet 15 to the inlet of distribution groove 17 to deliver flowing plastic to groove 17. Each of the grooves 16 and 17 have downstream edges which merge with conical surfaces 11 and 12 respectively. The flowing plastic flows over the downstream edges and into the extrusion passages A and B. The detailed structure of grooves 16 and 17 are similar to that shown in FIGS. 4 and 5.

Extrusion channels A and B merge together to form a single exit channel C. The two layers of plastic material join at the juncture of channels A and B subject to the elevated temperature and pressure of the die. Under normal circumstances material from channel B will be deposited around the circumference of the material introduced from channel A and the layered material will exit the die through channel C.

Sometimes it is desirable to use plastic materials of different viscosities in the molten condition. The application of the second layer than becomes problematical because the internal pressure within the die assembly will cause the second layer to disperse into the first layer to form a mixture instead of the desired discrete second layer. This is especially true when the lesser viscosity material is introduced as the first layer.

Figure 2:
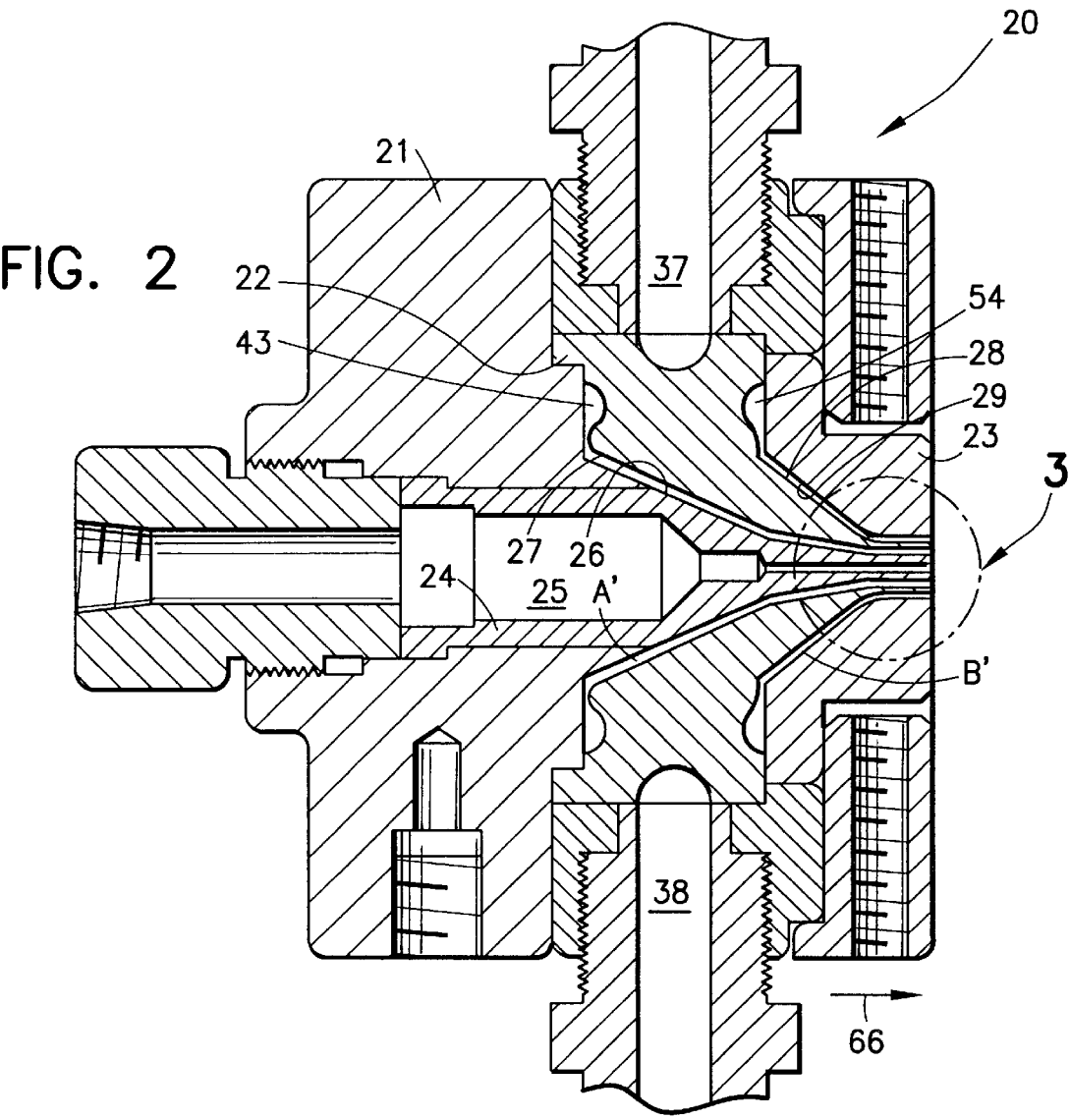
FIG. 2 is a sectional view through the axis of the die assembly of the subject invention.
Figure 3:
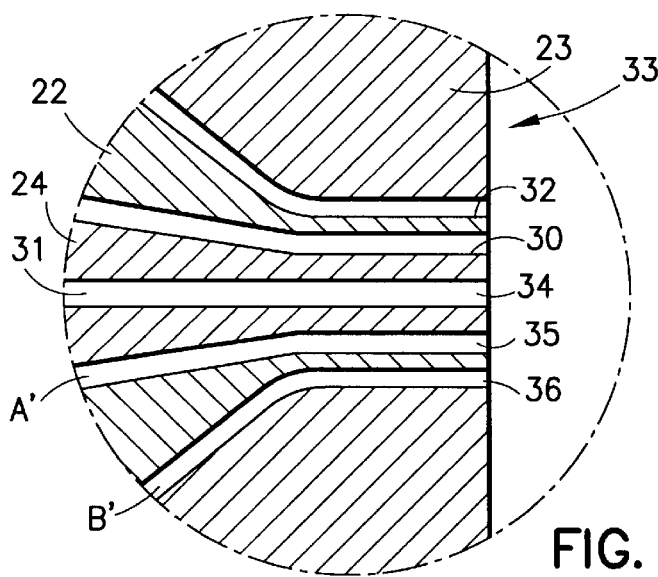
FIG. 3 is an enlargement of the exit of the die of this invention.
Figure 4:
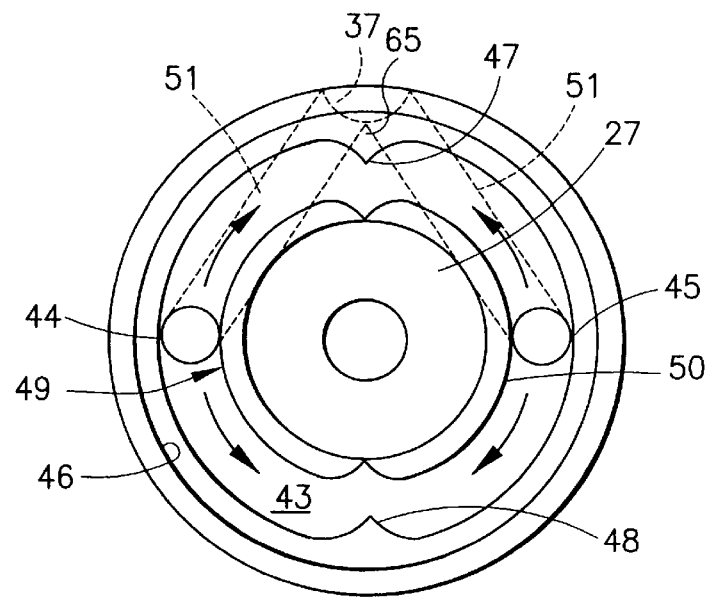
FIG. 4 is a side schematic view of the tip die of the die assembly shown in FIG. 2, showing the flow channels.
Figure 5:
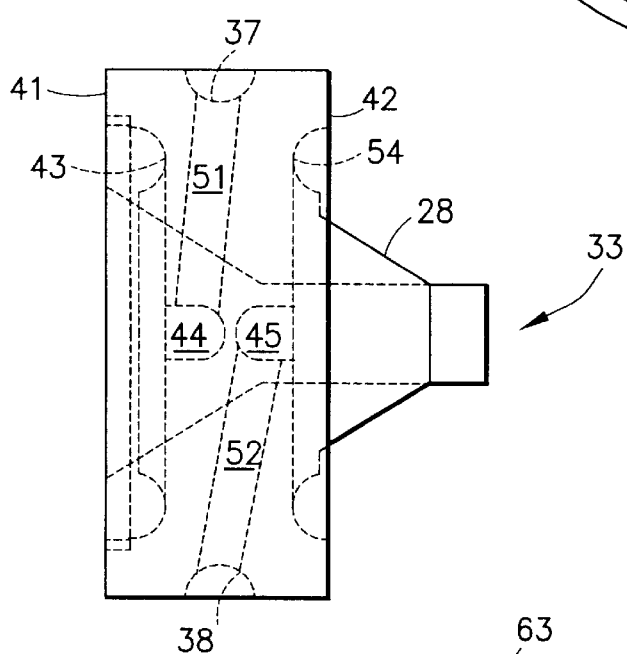
FIG. 5 is an end schematic view of the tip die shown in FIG. 4.

In order to eliminate this problem and promote the forming of discrete layers in spite of diverse viscosities, a new die assembly 20 is constructed, as shown in FIGS. 2 and 3, with passages A' and B' extending to the exit 33 of die 23 as shown in FIGS. 4 and 5, thereby eliminating an exit channel C.

The die assembly 20 of this invention is best shown in FIGS. 2 and 3. The basic components of die assembly 20 include cylindrical body 21, tip die 22, die 23, and tip 24. These components are generally cylindrical and are assembled in axial alignment for applications which involve the tubular coatings or products. A variety of retaining members may be used to secure the components in the assembled condition as in the die assembly of FIG. 1. These are not described in detail here as they are well known and do not form a part of the subject invention.

Similar to the die assembly 1 previously described, tip 24 is inserted in an axial bore extending the length of the die assembly 20 formed by the cooperation of the other components. Tip 24 has an axial bore 25 which can accommodate a wire to be coated with dual layers. Molten plastic flows through the assembly in the direction of arrow 66. The outer surface 26 of the housing of tip 24 is conical and cooperates with the inner surface 27 of the tip die 22 to form tapered channel A' for the material forming a first layer. The outer surface 28 of the tip die 22 is also conical and cooperates with a mating conical surface 29 on the die 23 to form the tapered channel B' for the second layer of the coating to be applied.

To accomplish the purpose of this invention, tip 24 is constructed having an elongated nozzle 30. The extension 30 of tip 24 is annular and encloses an axial bore 31. Similarly the tip die 22 is constructed with an extended nozzle 32. Nozzles 30 and 32 effectively extend channels A' and B' to the exit 33 of the die 23. The exit 33 of the die 23 consists of three radially displaced concentric outlets 34, 35, 36 for the bore 31, channels A' and B' respectively.

It is essential to the proper operation of die assembly 20 that a balanced flow be maintained throughout. Accordingly, the die assembly 20 is constructed with a balanced flow system starting with inlets 37 and 38 which receive molten plastic from extruders (not shown). Referring to FIGS. 4 and 5, tip die 22 comprises a cylindrical element having an upstream end 41 and downstream end 42. Grooves 43 and 54, having a semi-circular cross section, are constructed in the ends 41 and 42 respectively. Each groove has inlets 44 and 45 positioned one hundred and eighty degrees apart to receive molten plastic. The groove 43 has an upstream circumferential edge 46 in which are constructed two symmetrically placed blending wedges 47 and 48 extending into the groove to encourage movement of molten plastic in the groove radially inward. The blending wedges 47 and 48 are arranged equidistant from the inlets 44 and 45. The downstream edge 49 of the groove 43 consists of a flat land 50 merging into the conical surface 27. To enhance the distribution function of the groove 43, the land 50 is constructed of gradually diminishing width in each direction, away from the inlets, so that the downstream edge 49 merges directly into the conical surface 27 opposite the blending wedges 47 and 48 and operates to restrict the flow of plastic over the edge 49 at the inlets.

A pair of flow channels 51 are constructed within the tip die 22 in communication with the inlet 37 to receive molten plastic therefrom. The flow channels 51 communicate with the inlets 44 and 45 respectively of the groove 43 to deliver flowing plastic to the groove 43. As shown in phantom in FIG. 4, flow channels 51 diverge to avoid intersection with the conical surface 27. To enhance the even distribution of plastic into both channels, a flow dividing wedge 65 is constructed at the junction of the two channels.

Flowing plastic is introduced to the groove 43 symmetrically by the flow channels 51. The plastic flow diverges in opposite directions around the groove 43 as shown by the arrows in FIG. 4. Since the downstream edge 49 is of lesser height than the upstream edge 46, the molten plastic flows over the edge 49 to the conical surface 27. Because of the extended width of the land 50 of the edge 49 in the vicinity of the inlets 44 and 45, plastic flow over the edge 49 is restricted at the inlet and the groove tends to fill with plastic. The flow extends evenly over the edge 49 to create an even distribution of plastic in the conical extrusion passage A'. Blending wedges 47 and 48 tend to direct the flow of plastic over the edge 49 at its thinnest area, further enhancing the balanced distribution of the molten plastic. Together these elements 37, 51 and 43 form a balanced flow passage for the first layer of plastic.

Similarly flow channels 52 deliver molten plastic from inlet 38 to a second distribution groove 54 which is identical in structure to the groove 43 described above. The downstream groove merges with conical surface 28 which forms part of the tapered flow channel B'.

In this manner a totally balanced flow of two streams of extruded plastic exit the die assembly 20 at 33 and merge to form a dual layer on a wire which can be accurately controlled while avoiding any problem of mixing caused by the difference in viscosity.

The die assembly of this invention could be used to construct tubular shaped end products as well as the coated wire products illustrated. The central bore 31 of the tip 24 can be used to supply air internally to the layered tube to maintain an open central passage in the tubular product as is well known.

Figure 6:
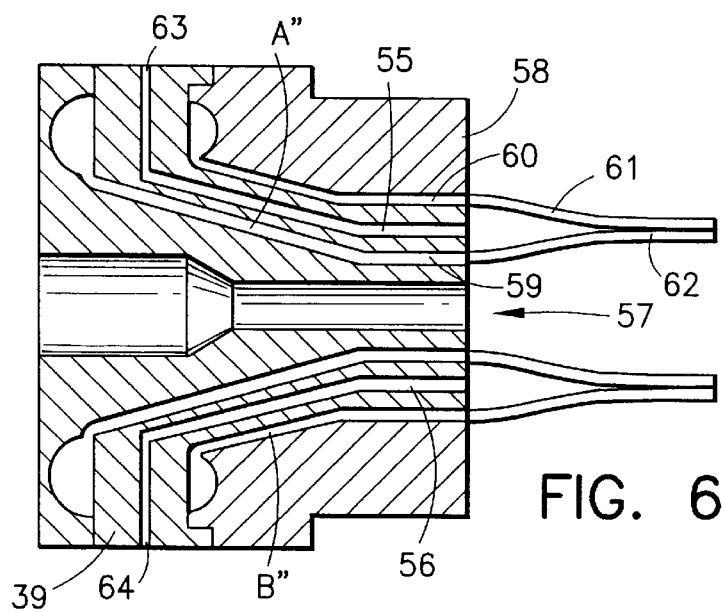
FIG. 6 is a sectional view through the axis of a die assembly providing a vacuum at the exit of the die.

In applications involving larger tubular products such as bags, it may be more difficult to achieve a strong adherence between the layers. In this instance it would be advantageous to apply a vacuum between the layers to draw the layers together. The structure of the subject invention is readily adaptable to this purpose. As shown in FIG. 6, an alternative embodiment is shown consisting of a modified tip die 39, which, in addition to the structure shown in FIGS. 2 through 5, includes slots 55 and 56. Slots 55 and 56 extend through the tip die 39 to the exit 57 of the die 58. A source of vacuum (not shown) is connected to the inlets 63 and 64 which communicate with the slots 55 and 56, as shown in FIG. 6. The slots emerge between the annular exits 59 and 60 of the passages A" and B" respectively. The two plastic streams 61 and 62 are drawn together by the vacuum and adherence of the two layers is enhanced.

I claim:

1. An extrusion die formed by an assembly of aligned components for extruding tubular plastic products having multiple layers, wherein the molten plastic materials used for forming adjacent layers have different properties, said assembly of components comprising:

a. a die body having an axially extending bore having upstream and downstream ends;

b. a tip die assembled downstream, adjacent to the die body and having a bore aligned with the axially extending bore of the die body to form a continuous bore therewith, the upstream surface of said tip die bore forming a first conical surface, said tip die having a second conical surface axially displaced downstream from said first conical surface, said conical surfaces being tapered radially inward in the downstream direction;

c. an end die assembled downstream, adjacent to the tip die and having a bore aligned with the axially extending bores of the die body and the tip die to form a continuous bore therewith, said end die having a mating conical surface which cooperates with the downstream conical surface of the tip die to form a first extrusion passage;

d. a tip inserted in the continuous bore and extending through said continuous bore to its downstream end, said tip having a central axial bore extending the length of the die assembly, said tip being constructed with an outer conical surface which cooperates with the first conical surface of the tip die to form a second extrusion passage;

e. separate supply channels constructed in the die assembly to distribute molten plastic to the first and second extrusion passages, each of said supply channels comprises a supply passage constructed in the components of the die assembly, said supply passage having upstream and downstream ends relative to the direction of plastic flow and further comprising:
   (i) an inlet constructed in one of the components to provide access to the supply passage, said inlet communicating with a source of flowable plastic to receive said plastic therefrom;
   (ii) first and second flow channels constructed in said one of the components in communication with the inlet, said flow channels extending downstream within the component;
   (iii) a distribution groove, constructed within said one of the components generally transverse to the direction of plastic flow, said groove forming an annular chamber to receive flowing plastic, said groove having first and second inlets positioned symmetrically in the chamber and communicating with said first and second channels respectively to receive flowing plastic therefrom, said groove having a downstream edge communicating with an annular outlet to allow flowing plastic to escape therefrom, said groove further comprising a pair of blending means to direct the flow of plastic towards the downstream edge, said blending means positioned symmetrically in the annular chamber equidistant from the first and second groove inlets;

f. said extrusion passages formed by the cooperation of the tip die with the end die and the tip extending to form an exit to enable the layers to be joined external to the die assembly under ambient pressure and temperature, said exit further comprising:
   (i) a first extended nozzle portion constructed in the tip to extend the central bore of the tip through the die assembly;
   (ii) a second extended nozzle portion constructed in the tip die to extend the first and second conical surfaces of the tip die to the downstream end of the die assembly; and
   (iii) said first and second nozzle portions and said end die cooperating to form separate concentric and coterminous exit channels for each of the extrusion passages and said central axial bore.

* * * * *